United States Patent
Chung et al.

(10) Patent No.: US 12,251,914 B2
(45) Date of Patent: Mar. 18, 2025

(54) STRETCHABLE SUBSTRATE HAVING IMPROVED THICKNESS DEFORMATION UNIFORMITY THROUGH CONTROL OF SPATIAL CROSSLINKING DEGREE AND METHOD OF MANUFACTURING THE SAME

(71) Applicant: Korea Institute of Science and Technology, Seoul (KR)

(72) Inventors: Seungjun Chung, Seoul (KR); Jun Chan Choi, Seoul (KR); Hoon Yeub Jeong, Seoul (KR); Phillip Lee, Seoul (KR); Jeong Gon Son, Seoul (KR); Heesuk Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 70 days.

(21) Appl. No.: 18/467,610

(22) Filed: Sep. 14, 2023

(65) Prior Publication Data
US 2025/0026102 A1    Jan. 23, 2025

(30) Foreign Application Priority Data

Jul. 21, 2023    (KR) .................. 10-2023-0094973

(51) Int. Cl.
| | |
|---|---|
| B32B 3/12 | (2006.01) |
| B32B 7/022 | (2019.01) |
| B32B 37/14 | (2006.01) |

(52) U.S. Cl.
CPC ............... *B32B 3/12* (2013.01); *B32B 7/022* (2019.01); *B32B 37/146* (2013.01); *B32B 2307/51* (2013.01); *B32B 2307/54* (2013.01); *B32B 2307/7376* (2023.05); *B32B 2457/00* (2013.01)

(58) Field of Classification Search
None
See application file for complete search history.

(56) References Cited

FOREIGN PATENT DOCUMENTS

| KR | 10-1749861 B1 | 6/2017 |
| KR | 2279067 B1 * | 7/2021 |

OTHER PUBLICATIONS

Machine translation of KR102279067B1 via EPO, translated Jan. 7, 2025 (Year: 2021).*

* cited by examiner

*Primary Examiner* — Elizabeth Collister
(74) *Attorney, Agent, or Firm* — Studebaker Brackett PLLC

(57) ABSTRACT

Provided is a method of manufacturing a stretchable substrate having improved thickness deformation uniformity through control of a spatial crosslinking degree according to various embodiments of the present disclosure to implement the above object. The method includes forming a substrate part of an elastic material, forming an auxetic including a plurality of unit structures on the substrate part, and forming a fixing part on the substrate part on which the auxetic is formed, wherein the fixing part has a different vertical crosslinking density at each position.

18 Claims, 12 Drawing Sheets

STRETCHABLE SUBSTRATE HAVING IMPROVED THICKNESS DEFORMATION UNIFORMITY THROUGH CONTROL OF SPATIAL CROSSLINKING DEGREE AND METHOD OF MANUFACTURING THE SAME

CROSS-REFERENCE TO RELATED APPLICATION

This application claims priority to and the benefit of Korean Patent Application No. 2023-0094973, filed on Jul. 21, 2023, the disclosure of which is incorporated herein by reference in its entirety.

BACKGROUND

1. Field of the Invention

The present disclosure relates to a stretchable substrate into which a mechanical metamaterial having an auxetic structure is introduced, and more particularly, to a stretchable substrate in which a spatial crosslinking degree of a matrix is programmed for each region to improve thickness deformation uniformity during stretching of a substrate, and a method of manufacturing the same.

2. Discussion of Related Art

In recent years, beyond conductive elements in which electrodes are formed on a rigid substrate, research and development has been actively conducted on stretchable electronic elements in which electrodes are formed on a flexible substrate. Stretchable electronic elements are electronic elements that are manufactured on a substrate that is freely stretchable in response to external stress and are next-generation electronic elements that maintain the electrical/physical properties of an element even when mechanical deformation occurs or external force is applied. Such stretchable electronic elements may be applied to flexible devices, wearable devices, or the like, and furthermore, may be used as displays or sensors or electrodes attached to the human body.

Stretchable electronic elements may be most widely used in fields such as stretchable displays, stretchable solar cells, and stretchable energy storage/power generation devices. The stretchable electronic elements are showing potential as a next-generation technology following flexible displays. In addition, the stretchable electronic elements not only increase a degree of freedom in design due to excellent mechanical variability thereof but also secure mechanical stability against an external force, and are therefore expanding to markets such as wearable devices, electronic skin, smartphones, medical devices, healthcare monitoring systems, defense, and aerospace.

For a specific example, the field of displays is developing in a direction of increasing degrees of freedom of deformation, fixed flat/curved displays to flexible, foldable, or rollable displays that are foldable or rollable in a single direction. Recently, as electronic devices have become smart and spatial mobility thereof has been emphasized more, there has arisen a need to leave behind fixed displays and develop a stretchable display that is deformable in multidimensional axis directions under various conditions and freely usable.

As described above, with the advancement of technology related to the field of stretchable displays, the implementation of new digital interfaces beyond existing methods is expected to become possible. For example, a stretchable display may be implemented through an elastic substrate which has a negative Poisson's ratio, that is, of which, when stretched in one axial direction, a strain in another axial direction is controllable.

As described above, with the advancement of technology related to the field of stretchable displays, the implementation of new digital interfaces beyond existing methods is expected to become possible. For example, a stretchable display may be implemented through an elastic substrate which has a negative Poisson's ratio, that is, of which, when stretched in one axial direction, a strain in another axial direction is controllable.

However, in such a stretchable display, a negative Poisson's ratio may be controlled in the overall aspect of a substrate, but stress may be nonuniform for each pixel section. Specifically, when a stretchable substrate using an auxetic structure is stretched based on an external stress application point, the stretchable substrate may have a different stress distribution for each position due to a shape of each unit structure constituting an auxetic.

In addition, due to a Poisson effect through an auxetic structure, when a substrate is stretched, the substrate contracts in the thickness direction to maintain the volume, and nonuniform thickness deformation occurs due to the mechanical properties of an auxetic and a matrix part and an induced stress deviation.

In particular, a rapid decrease in thickness appears in a matrix part due to stress concentrated in an auxetic structure, and such a deformation deviation is transferred to a surrounding matrix. Due to nonuniform thickness deformation, a surface of a substrate has an even topology, and as a result, light incident on the substrate is refracted and scattered in irregular directions, which may cause blur of a display image. In addition, due to a topology of a surface, mechanical reliability due to cracks or the like of elements in contact with a substrate may be degraded. In particular, problems may be maximized in a region in which a thickness is rapidly reduced due to stress concentration.

Therefore, in the art, there may be a demand for research and development on a method of improving a thickness deformation degree deviation through programming of a spatial crosslinking degree of a matrix to control uniform stretching deformation when a stretchable substrate having a negative Poisson's ratio is provided.

RELATED ART DOCUMENTS

Patent Documents

Korean Registered Patent Publication No. 10-1749861 (Jun. 15, 2017)

SUMMARY OF THE INVENTION

The present disclosure is directed to providing a stretchable substrate in which a spatial crosslinking degree of a matrix is programmed for each region to improve thickness deformation uniformity during stretching of a substrate, and a method of manufacturing the same.

The technical objects of the present disclosure are not limited to those described above, and other undescribed technical objects will become apparent to those skilled in the art from the following description.

According to an aspect of the present invention, there is provided a method of manufacturing a stretchable substrate having improved thickness deformation uniformity through control of a spatial crosslinking degree, the method including forming a substrate part of an elastic material, forming an auxetic including a plurality of unit structures on the substrate part, and forming a fixing part on the substrate part on which the auxetic is formed, wherein the fixing part has a different vertical crosslinking density at each position.

The auxetic may be provided to have a Young's modulus that is higher than a Young's modulus of the substrate part and a Young's modulus of the fixing part.

The forming of the fixing part may include forming the fixing part to have different vertical crosslinking degrees through a crosslinking agent post-treatment process, and the crosslinking agent post-treatment process may be a process of controlling a degree of permeation of a crosslinking agent in a thickness direction of the fixing part.

The crosslinking agent post-treatment process may include temperature and time conditions that do not cause deformation of the substrate part and do not affect Young's modulus deformation of the auxetic.

The crosslinking agent post-treatment process may be performed through different temperature and time conditions at each position at which the fixing part is formed.

The crosslinking agent post-treatment process may be performed such that a depth to which the crosslinking agent is injected is deep in a fixing part region corresponding to a position at which deformation in the thickness direction is large, and a depth to which the crosslinking agent is injected is shallow in a fixing part region corresponding to a position at which deformation in the thickness direction is small.

The method may further include forming a stress dissipation layer, and attaching the formed stress dissipation layer to at least one surface of the substrate, wherein the stress dissipation layer is made of an elastomer material.

The stress dissipation layer may be provided to have a higher Young's modulus than the fixing part to control a Poisson's ratio.

The stress dissipation layer may be provided to have a Young's modulus that is higher than or equal to a Young's modulus of the auxetic and have a thickness of $\frac{1}{20}$ or less of a thickness to which the auxetic is formed.

According to another aspect of the present invention, there is provided a stretchable substrate having improved thickness deformation uniformity through control of a spatial crosslinking degree, the stretchable substrate including a substrate part made of an elastic material, an auxetic including a plurality of unit structures and formed on the substrate part, and a fixing part configured to fix the auxetic, wherein the fixing part has a different vertical crosslinking density at each position.

The auxetic may be provided to have a Young's modulus that is higher than a Young's modulus of the substrate part and a Young's modulus of the fixing part.

The fixing part may be formed to have different vertical crosslinking degrees through a crosslinking agent post-treatment process, and the crosslinking agent post-treatment process may be a process of controlling a degree of permeation of a crosslinking agent in a thickness direction of the fixing part.

The crosslinking agent post-treatment process may include temperature and time conditions that do not cause deformation of the substrate part and do not affect Young's modulus deformation of the auxetic.

The crosslinking agent post-treatment process may be performed through different temperature and time conditions at each position at which the fixing part is formed.

The crosslinking agent post-treatment process may be performed such that a depth to which the crosslinking agent is injected is deep in a fixing part region corresponding to a position at which deformation in the thickness is large, and a depth to which the crosslinking agent is injected is shallow in a fixing part region corresponding to a position at which deformation in the thickness direction is small.

The stretchable substrate may further include a stress dissipation layer provided in contact with at least one surface of the stretchable substrate and made of an elastomer material.

The stress dissipation layer may be provided to have a higher Young's modulus than the fixing part to control a Poisson's ratio.

The stress dissipation layer may be provided to have a Young's modulus that is higher than or equal to a Young's modulus of the auxetic and have a thickness of $\frac{1}{20}$ or less of a thickness to which the auxetic is formed.

Other concrete matters of the present disclosure are included in the detailed description and drawings of the specification.

BRIEF DESCRIPTION OF THE DRAWINGS

Now, various aspects will be described with reference to the accompanying drawings in which like reference numerals collectively designate like elements. In the following embodiments, for the purpose of description, various specific details are suggested to provide overall understanding of one or more aspects. However, it is obvious that the aspects may be embodied without the specific details.

DETAILED DESCRIPTION OF EXEMPLARY EMBODIMENTS

Figure 1:
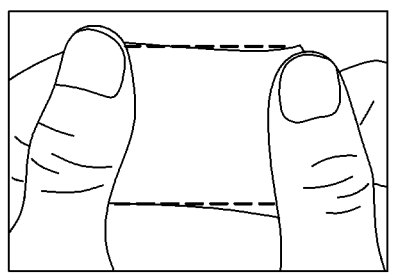
FIG. 1 shows schematic diagrams illustrating an auxetic structure and a non-auxetic structure according to one embodiment of the present disclosure.
Figure 1:
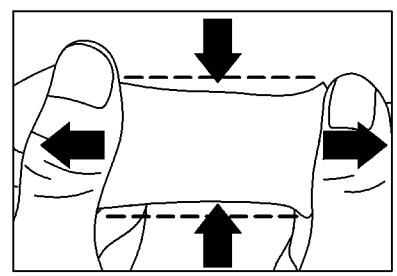
Figure 1:
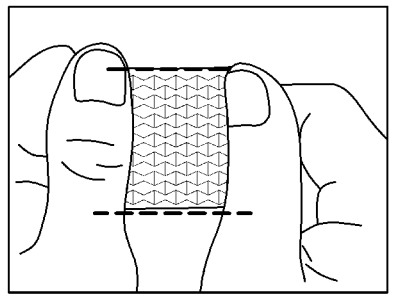
Figure 1:
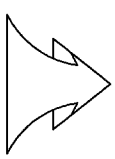

Various embodiments and/or aspects will be disclosed with reference to the accompanying drawings. In the following description, for the purpose of description, various specific details are disclosed to provide overall understanding of one or more aspects. However, those skilled in the art may understand that the aspect(s) may be embodied without having the specific details. The following description and accompanying drawings thoroughly describe specific exemplary aspects of one or more aspects. However, the aspects are provided for an illustrative purpose, some of various methods in principles of the various aspects may be used, and the descriptions are intended to include all of the aspects and equivalents thereof. Specifically, "embodiment," "example," "aspect," "illustration," and the like used in the present specification may not be interpreted as a described arbitrary aspect or design being better than or more advantageous than other aspects or designs.

Hereinafter, in the drawings, the same or similar elements are denoted by the same reference numerals even when they are depicted in different drawings, and a detailed description of the same or similar elements will be omitted. In addition, in the following description of the embodiments disclosed herein, a detailed description of related arts will be omitted when it is determined that the gist of the embodiments disclosed herein may be obscured. Also, the accompanying drawings are used to help easily understand the embodiments disclosed herein, and it should be understood that the technical ideas disclosed herein are not limited by the accompanying drawings.

It will be understood that, although the terms "first," "second," etc. may be used herein to describe various elements or components, these elements or components should not be limited by these terms. These terms are only used to distinguish one element or component from another element or component. Thus, a first element or component discussed below could be termed a second element or component without departing from the technical idea of the present disclosure.

Unless otherwise defined, all terms (including technical and scientific terms) used in the present specification may be used with the same meaning which may be commonly understood by a person with ordinary skill in the art to which the present disclosure belongs. It will be further understood that terms defined in commonly used dictionaries should not be interpreted in an idealized or excessive sense unless expressly and specifically defined.

Further, the term "or" is intended to mean not exclusive "or" but inclusive "or." That is, when it is not specifically designated or unclear in the context, "X uses A or B" is intended to refer to one of natural inclusive substitutions. In other words, "X uses A or B" may apply to any case of "X uses A," "X uses B," or "X uses both A and B." Further, it should be understood that the term "and/or" used in the present specification indicates and includes all possible combinations of one or more items among related listed items.

It should be understood that the term "comprise" and/or "comprising" means existence of the corresponding feature and/or element but does not exclude the existence or addition of one or more other features, elements, and a group thereof. In addition, when not separately defined or not clear in terms of the context that a singular form is indicated, it should be construed that the singular form generally means "one or more" in the present specification and the claims.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In addition, a suffix "module," "unit," or "portion" of an element used herein is assigned or incorporated for convenience of specification description, and the suffix itself does not have a distinguished meaning or function.

It will be understood that when an element or layer is referred to as being "on" or "above" another element or layer, the element or layer can be directly on or above the other element or layer or intervening elements or layers may be present. In contrast, when an element is referred to as being "directly on" or "directly above," there are no intervening elements or layers.

Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or in operation, in addition to the orientation depicted in the figures.

For example, when the device in the figures is turned over, elements described as "below," "beneath" or "under" other elements or features would then be oriented "above" the other elements or features. Thus, the exemplary term "below" can encompass both an orientation of above and below. Since an element may be oriented in another direction, the spatially relative terms may be interpreted in accordance with the orientation of the element.

The objects and effects of the present disclosure and technical solutions for accomplishing these may be apparent with reference to embodiments to be described below in detail along with the accompanying drawings. In the description of the present disclosure, detailed descriptions of known functions or configurations will be omitted lest they should obscure the subject matter of the present disclosure. The terms as set forth herein are defined in consideration of the functions of the present disclosure and may vary according to customs or the intent of a user and an operator.

However, the present disclosure is not limited to the embodiments set forth below and may be embodied in various other forms. The present embodiments may be provided to make the present disclosure complete and to enable a person skilled in the art to fully understand the category of the present disclosure. The present disclosure may be defined only by the category described in the appended claims Thus, the definition may be made based on the entirety of the description of the present specification.

A stretchable substrate 100 (hereinafter referred to as "stretchable substrate") having improved thickness deformation uniformity through control of a spatial crosslinking degree according to the present disclosure may have a negative Poisson's ratio and may include an auxetic 20 formed through a plurality of unit structures. The auxetic 20 may be a mechanical metamaterial that did not previously exist having a mechanism for exhibiting a new mechanical function through a plurality of unit structures. For example, the auxetic 20 related to the mechanical metamaterial may have a structure that expands in a vertical direction unlike typical stretching in nature.

Specifically, the auxetic 20 included in the stretchable substrate 100 may include the plurality of unit structures. In this case, since each unit structure is provided through a specific shape, the auxetic 20 may have a negative Poisson's ratio. A Poisson's ratio may be a ratio of transverse strain to longitudinal strain when a tensile force is applied to a material to stretch the material in a specific direction. In other words, the Poisson's ratio may be a strain of a transverse direction versus a longitudinal direction.

Most of materials have a positive Poisson's ratio because a strain in a stretching direction and a strain in a lateral direction of a material have different signs when a tensile force is applied along a single axis. However, when a material is designed to form a specific lattice structure, a negative Poisson's ratio can be realized macroscopically even when a structural material has a positive Poisson's ratio.

For a specific example, referring to FIG. 1, in a material having a general non-auxetic structure, when stress is applied in a transverse direction, the material expands in the transverse direction and contracts in a longitudinal direction at the same time. That is, a Poisson's ratio between longitudinal deformation and transverse deformation to a vertical stress generated inside the material may be positive.

On the other hand, in a material having an auxetic structure, when stress is applied in a transverse direction, the material may expand in both transverse and longitudinal directions. That is, a Poisson's ratio due to a vertical stress generated inside the material may be negative.

According to one embodiment of the present disclosure, the stretchable substrate 100 may include a substrate part 10 on which the auxetic 20 is formed. The substrate part 10 included in the stretchable substrate 100 may be provided to support the auxetic 20 in a process of forming the auxetic 20 and may be provided in the shape of a thin film. In addition, the substrate part 10 may be made of an elastic material having an elastic force. For example, the substrate part 10 may be made of an elastic material such as polydimethylsiloxane (PDMS), thermoplastic polyurethane (TPU), VHB™ tape, or butyl rubber which has an elastic modulus that is greater than or equal to a preset reference value. The detailed description of the above-described substrate part is merely an example, and the present disclosure is not limited thereto.

The auxetic 20 may be provided on one surface of the substrate part 10. In the present disclosure, the providing of the auxetic 20 on one surface of the substrate part 10 may include fixing the auxetic 20 to the one surface of the substrate part 10 after separately manufacturing the substrate part 10 and the auxetic 20 or forming the auxetic 20 on the one surface of the substrate part 10 in a process of forming the substrate part 10. For example, the auxetic 20 may be provided on an upper portion of the substrate part 10 by performing a printing process on the upper portion of the substrate part 10 through an elastic material in a liquid state and then performing curing under specific curing conditions. By using the substrate part 10 as a support, a plurality of unit structures having a specific shape may be formed at the upper portion through a printing process using an elastic material, thereby forming the auxetic 20. The detailed description of the above-described process of providing the auxetic is merely an example, and the present disclosure is not limited thereto.

The printing process in the present disclosure may be a process of printing a target object with a designed circuit pattern through an inkjet printer, a laminator, or the like and may be a roll-to-roll process of forming (or stacking) a specific lattice structure (that is, a plurality of unit structures having a specific shape) through a stretchable or elastic material. Such a printing process may be a process using a device such as an inkjet device, a pneumatic dispenser, a screw dispenser, a screen printing device, a bar coater, or a spray printing device. The detailed description of the devices used in the above-described printing process is merely an example, and the present disclosure is not limited thereto.

That is, the auxetic 20 may be formed on the stretchable substrate 100 through a printing process using an elastic material. Through the printing process, it may be possible to form the auxetic corresponding to an interval and size of several tens to several hundreds of microns. Thus, it is possible to provide a high degree of freedom in design and a high degree of freedom in material and concurrently provide high efficiency in a large-area process.

As described above, unlike general materials, the auxetic 20 of the present disclosure may be a material that has a negative Poisson's ratio, that is, one that is designed such that a transverse strain and a longitudinal strain have the same sign. In other words, the stretchable substrate 100 of the present disclosure is formed through the auxetic 20 which is a mechanical metamaterial designed in a specific lattice structure, thereby controlling a negative Poisson's ratio or a strain in a direction perpendicular to a stretching direction. The Poisson's ratio is an inherent characteristic of a material but can be controlled by forming a specific structure in the material.

According to an embodiment, the auxetic of the present disclosure may relate to a re-entrant structure. As an example, as shown in FIGS. 1 to 5, the auxetic may be formed through a plurality of unit structures having a re-entrant shape.

Figure 2:
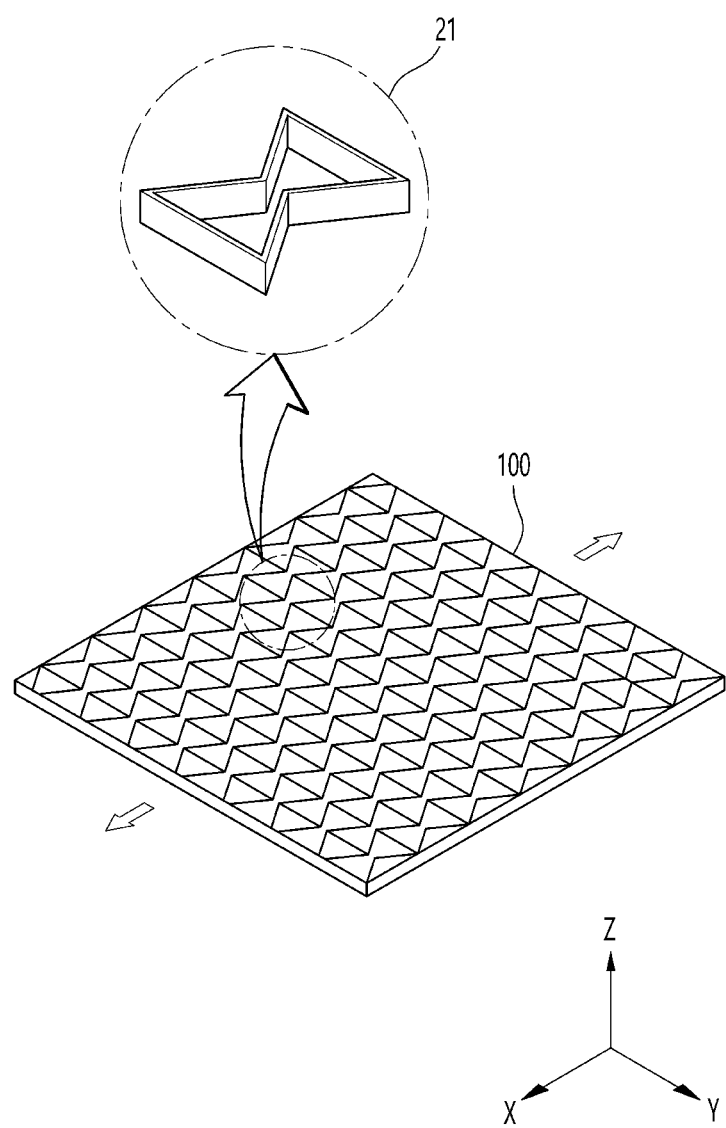
FIG. 2 is an exemplary diagram illustrating a re-entrant auxetic structure according to one embodiment of the present disclosure.

For example, when the auxetic 20 is provided through a re-entrant structure, each of the plurality of unit structures may have a bowtie shape as shown in FIG. 2. When an external force is applied to the auxetic 20 in a longitudinal direction (that is, when the auxetic is stretched in one direction), as each of the plurality of unit structures unfolds, internal stress may act in a transverse direction, and thus the auxetic 20 may have a negative Poisson's ratio. In response to an external force along a longitudinal axis, the auxetic 20 may be stretched along a transverse axis. In other words, in the auxetic 20, since each of the plurality of unit structures provided therein is implemented through a bowtie shape, when an external force is applied along an axis in one direction, a strain along an axis in another directions may be controlled.

That is, the stretchable substrate 100 implemented through the auxetic 20 may be a substrate to which unique mechanical properties that do not exist in nature are given by using a new structure. The stretchable substrate 100 may have high applicability in various fields. For example, the stretchable substrate 100 of the present disclosure may be applied to a flexible device, a wearable device, or the like and used to maintain electrical or physical properties of an element against external stress. For another example, when the stretchable substrate 100 of the present disclosure is used in the field of displays, the stretchable substrate 100 may support deformation in multidimensional axis directions under various conditions, breaking away from fixed displays that fold or roll in a single direction. Thus, higher variability may be provided to improve a degree of freedom in design and also secure mechanical stability against an external force.

Figure 3:
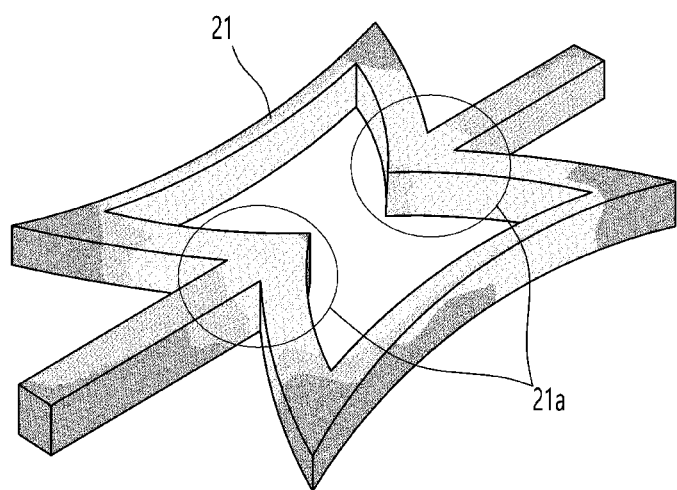
FIG. 3 is an exemplary diagram illustrating nonuniform stress being applied to a unit structure according to one embodiment of the present disclosure.

In the stretchable substrate 100, a negative Poisson's ratio may be controlled in terms of the entire substrate, but during stretching, stress generated in each region may be nonuniform. Referring to FIG. 3, a tensile force applied to each region of a unit structure during stretching may be different. That is, stress applied to an entire substrate formed through a plurality of unit structures may not be uniform. Specifically, angular momentum applied to an auxetic structure may depend on a re-entrant angle (for example, a connection angle in each unit structure). In an embodiment, as a substrate is stretched, an included angle of a structure my increase, and accordingly, greater external stress may be required for a change of an auxetic. In this case, a phenomenon may occur in which stress is concentrated in an intersection region 21a in which three sides of each unit structure intersect each other. In other words, when external stress is applied for stretching, more force may be applied to the intersection region 21a in which three sides of each unit structure intersect each other. As described above, when stress is concentrated in a specific region, it may cause a phenomenon in which a structure is fractured and delaminated.

In addition, as shown in FIG. 2, the stretchable substrate 100 of the present disclosure may include the auxetic 20 including the plurality of unit structures. In this case, different induced stress may be distributed to each position of each unit structure, and thus nonuniform deformation of the structure may occur.

Figure 4:
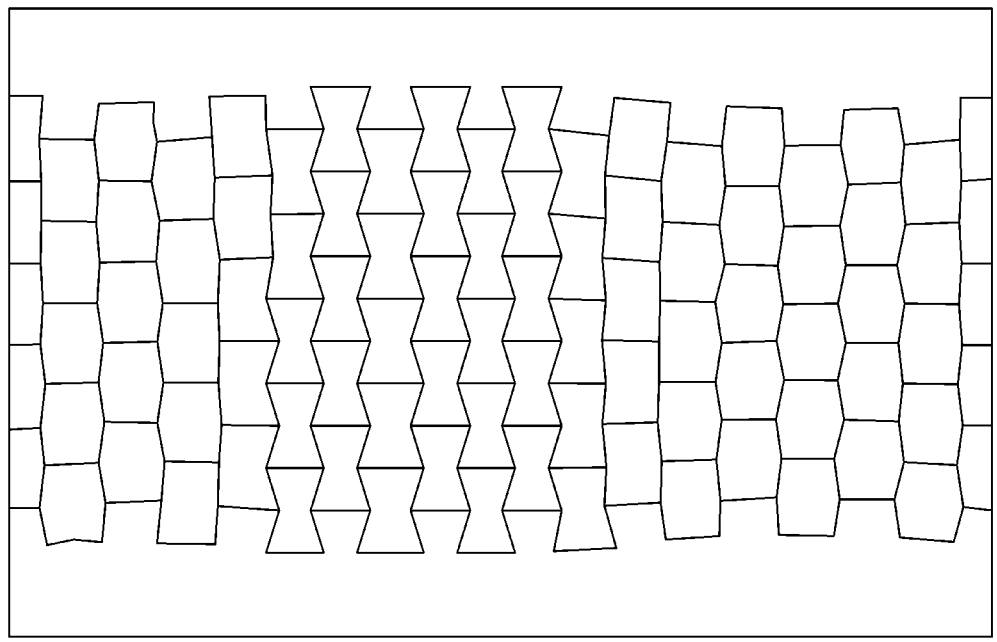
FIG. 4 is an exemplary diagram illustrating a different stress distribution occurring for each region when a substrate is stretched.

More specifically, as shown in FIG. 4, nonuniform stress may be applied to each unit structure according to a position of a substrate at which the unit structure is provided. For example, when an external force for stretching is applied, unit structures positioned at an edge are easily stretched, but unit structures positioned at a central portion may not completely receive a force to thus be less easily stretched. That is, as shown in FIG. 4, both end edges may be stretched because unit structures present at corresponding positions unfold, but the central portion may not be stretched because unit structures present at corresponding positions do not unfold. When both end portions of the substrate are grasped and stretched, stress transferred to each position of each unit structure may be different, and thus a degree of unfolding may be different for each unit structure.

In other words, since induced stress is nonuniform among regions of the substrate, stretching may also be nonuniformly generated. That is, stresses with a different magnitude is induced at each position due to a stress tailoring effect. Under the same external stress condition, stress with a smaller magnitude is induced in a direction away from a stretching point, which is influenced by the stretching point and an area of the substrate or mechanical properties.

Figure 5:
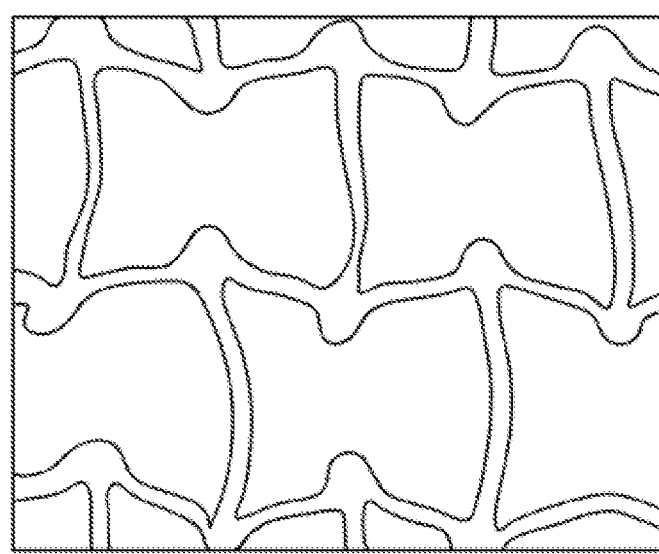
FIG. 5 is an exemplary diagram illustrating deformation of a structure caused by a nonuniform stress distribution according to one embodiment of the present disclosure.

Accordingly, when the stretchable substrate 100 is stretched, as shown in FIG. 5, a deformation deviation may occur in the entire substrate, which may cause distortion. That is, in the case of a stretchable substrate into which mechanical metamaterials having the same structure in the entire region of the substrate are introduced, a difference in degree of structural deformation appears due to spatially induced stress deviation during stretching. This may cause a decrease in the Poisson's ratio control effect due to the introduction of a mechanical metamaterial (for example, an auxetic) and may cause image distortion problems in a variable type display, in particular, a large-area display.

In addition, due to a Poisson effect through an auxetic structure, when a substrate is stretched, the substrate contracts in a thickness direction to maintain a volume, and nonuniform thickness deformation occurs due to the mechanical properties of an auxetic and a matrix (or a fixing part) and an induced stress deviation.

For a specific example, when a tensile force for stretching is applied along an x-axis (for example, a transverse direction), a general elastic substrate may contract in a y-axis direction (for example, a longitudinal direction). On the other hand, in a stretchable substrate into which a mechanical metamaterial (for example, an auxetic material) is introduced as in the present disclosure, since a Poisson's ratio may be controlled to have a negative value, in response to an external force generated along the x-axis, the stretchable substrate may be stretched or maintained in the y-axis direction. That is, when stress is applied in an x-axis direction, the stretchable substrate may be stretched along both the x-axis and the y-axis. However, the stretching in both of the x-axis and y-axis directions may accelerate contraction in a z-axis direction (for example, a height or thickness direction). In other words, when an external force for stretching of a substrate occurs in the x-axis or y-axis direction, rapid contraction occurs in the z-axis direction, and such deformation in the z-axis direction may cause distortion on a surface or cause degradation in image quality in the field of displays using a stretchable substrate. In addition, deformation in a thickness direction affects the performance of related elements disposed adjacent to a surface of a substrate.

Meanwhile, when nonuniform deformation occurs in a thickness direction in accordance with the entire area of a substrate, a surface of the substrate may have an uneven topology, which may cause image blur. In addition, due to cracks or the like of an element in contact with a substrate due to a topology of a surface, mechanical reliability is degraded. Thus, there is a concern that the mechanical separation of an element positioned on a stretchable substrate may be accelerated and shorten a lifetime of the element. In particular, when the performance of an element is directly affected by a surface shape as in a display or a solar cell, a solution to a corresponding issue may be required.

As described above, in order to prevent a problem that nonuniform deformation occurs in a thickness direction during stretching of a stretchable substrate into which a mechanical metamaterial, that is, an auxetic, is introduced, the present disclosure is directed to providing a stretchable substrate 100 having improved thickness deformation uniformity through programming of a spatial crosslinking degree.

Hereinafter, each component of a stretchable substrate having improved thickness deformation uniformity through control of a spatial crosslinking degree and a method of manufacturing the same will be described in detail with reference to FIGS. 6 to 12.

Figure 6:
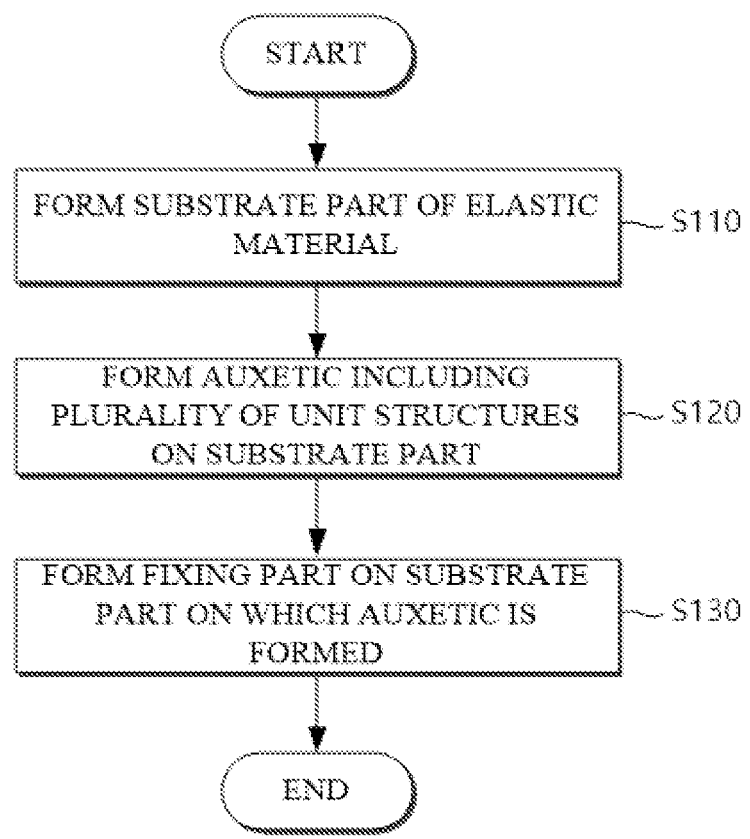
FIG. 6 is an exemplary flowchart for manufacturing a stretchable substrate having improved thickness deformation uniformity through control of a spatial crosslinking degree according to one embodiment of the present disclosure.

FIG. 6 is an exemplary flowchart for manufacturing a stretchable substrate having improved thickness deformation uniformity through control of a spatial crosslinking degree according to one embodiment of the present disclosure. The order of operations shown in FIG. 6 may be changed as needed, and at least one operation may be omitted or added. That is, the operations of FIG. 6 are merely one embodiment of the present disclosure, and the scope of the present disclosure is not limited thereto.

According to one embodiment of the present disclosure, a method of manufacturing a stretchable substrate having improved thickness deformation uniformity through control of a spatial crosslinking degree may include forming a substrate part 10 of an elastic material (S110).

Figure 7:
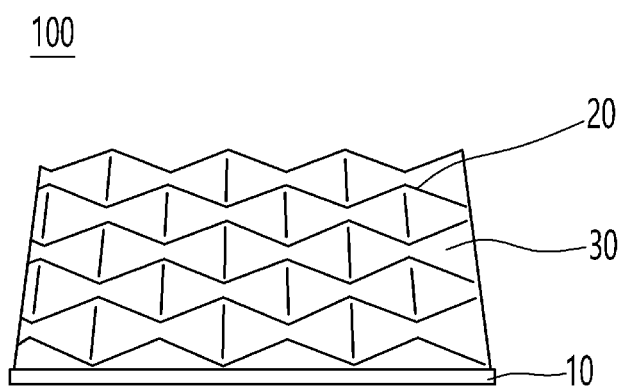
FIG. 7 is an exemplary diagram illustrating a stretchable substrate having improved thickness deformation uniformity through control of a spatial crosslinking degree according to one embodiment of the present disclosure.

The substrate part 10 may be provided to support an auxetic 20 in a process of forming the auxetic 20 and may be provided in the shape of a thin film as shown in FIG. 7. In addition, the substrate part 10 may be made of an elastic material having an elastic force. For example, the substrate part 10 may be made of an elastic material such as PDMS, TPU, VHB™ tape, or butyl rubber which has an elastic modulus that is greater than or equal to a preset reference value. The detailed description of the above-described substrate part is merely an example, and the present disclosure is not limited thereto. The substrate part 10 may be used as an elastic film for supporting the auxetic 20 in a process of forming the auxetic 20 and may form a lower surface of the stretchable substrate 100.

According to one embodiment of the present disclosure, the method of manufacturing a stretchable substrate having improved thickness deformation uniformity through control of a spatial crosslinking degree may include forming the auxetic including a plurality of unit structures on the substrate part 10 (S120).

According to an embodiment, the auxetic 20 may be made of a material having higher strength than the substrate part 10. The auxetic 20 may be provided to have a Young's modulus that is higher than a Young's modulus of the substrate part 10. Since the auxetic 20 is provided to have a higher Young's modulus than the substrate part 10, the auxetic 2 may have a great effect on the deformation of the substrate part 10.

Since the stretchable substrate 100 including the substrate part 10 and the auxetic 20 is greatly affected by the deformation of the auxetic 20 having relatively high strength, the stretchable substrate 100 may be provided to have a negative Poisson's ratio. A Poisson's ratio of a substrate related to the present disclosure can be reduced through such strength of the auxetic, and the substrate can be stretched in various axial directions.

Since the stretchable substrate 100 of the present disclosure includes the plurality of unit structures having a specific shape, in response to an external force generated along one axis, deformation in another axial direction may be caused. For example, one axis along which an external force is generated may be a transverse axis, and another axis may be a longitudinal axis in a vertical direction on the same plane as the axis along which the external force is generated. As a detailed example, when one axis is an x-axis based on a two-dimensional plane, another axis may be a y-axis.

According to an embodiment, an auxetic structure of the present disclosure may include a re-entrant structure, a rotating unit structure, and a chiral structure, but the present disclosure is not limited thereto. As an example, as shown in FIGS. 1 to 5, the auxetic may be formed through a plurality of unit structures having a re-entrant shape.

For example, as shown in FIG. 2, each of the plurality of unit structures may have a bowtie shape. When an external force is applied to the auxetic 20 in a longitudinal direction (that is, when the auxetic is stretched in one direction), as each of the plurality of unit structures unfolds, internal stress acts in a transverse direction, and thus the auxetic 20 may have a negative Poisson's ratio. In response to an external force along a longitudinal axis, the auxetic 20 may be stretched along a transverse axis. In other words, in the auxetic 20, since each of the plurality of unit structures provided therein is implemented through a bowtie shape, when an external force is applied along an axis in one direction, a strain along an axis in another direction may be controlled.

That is, the stretchable substrate 100 implemented through the auxetic 20 may be a substrate to which unique mechanical properties that do not exist in nature are given by using a new structure. The stretchable substrate 100 may have high applicability in various fields. For example, the stretchable substrate 100 of the present disclosure may be applied to a flexible device, a wearable device, or the like and used to maintain electrical or physical properties of an element against external stress. As another example, when the stretchable substrate 100 of the present disclosure is used in the field of displays, the stretchable substrate 100 may support deformation in multidimensional axis directions under various conditions, breaking away from fixed displays that fold or roll in a single direction. Thus, higher variability may be provided to improve a degree of freedom in design and also secure mechanical stability against an external force.

In an embodiment, a distance or height by which the auxetic 20 is inserted may be controlled through a corresponding printing process. Thus, when the stretchable substrate 100 manufactured through a corresponding process is stretched, it is possible to control a strain in relation to one axis or another axis in a direction perpendicular to one axis. That is, the auxetic 20 of the present disclosure may control a strain related to another axis based on an interval between the plurality of unit structures or a thickness of each of the plurality of unit structures. The interval between the plurality of unit structures may be a distance between the unit structures or a size of each of the unit structures. For example, the interval between the plurality of unit structures being short may mean that the size of each of the unit structures is relatively small such that the plurality of unit structures are formed at narrow distances. That is, the interval between the unit structures may be inversely proportional to the number of unit structures included per unit area. In other words, the interval between the unit structures being long may mean that the number of unit structures per unit area is small, and the interval between the unit structures being short may mean that the number of unit structures per unit area is large. Also, the thickness of each of the plurality of unit structures may be the thickness or depth of each of the unit structures in the stretchable substrate 100.

Specifically, in response to an external force generated along one axis, a strain caused along another axis may be determined. Also, the interval between the plurality of unit structures or the thickness of the plurality of unit structures may be determined based on the determined strain. Also, the auxetic may be formed by performing a printing process corresponding to the interval or thickness.

That is, the interval between the plurality of unit structures included in the auxetic 20 or the thickness of the plurality of unit structures may be associated with control of a strain related to another axis. For example, when the interval between the plurality of unit structures included in the auxetic 20 is short, the strain related to another axis may be greater. In addition, when the interval between the plurality of unit structures included in the auxetic 20 is long, the strain related to another axis may be smaller.

That is, when the interval between the plurality of unit structures is relatively short, the number of unit structures per unit area may be relatively large. Thus, when an external force related to one axial direction is generated, a strain along another axis may be greater. For example, when an external force is generated along a transverse axis (for example, an x-axis) in the auxetic 20 in which the interval between the plurality of unit structures is relatively short, deformation (for example, relatively large mechanical deformation) corresponding to the number of unit structures may be generated along a longitudinal axis (for example, the y-axis) in a direction perpendicular to the axis along which the external force is generated. On the other hand, when the interval between the plurality of unit structures is relatively long, the number of unit structures per unit area may be relatively small Thus, when a tensile force is generated along one axis, a strain along another axis may be smaller. In addition, for example, when an external force is generated along a transverse axis (for example, an x-axis) in the auxetic 20 in which the interval between the plurality of unit structures is relatively long, deformation (for example, relatively small mechanical deformation) corresponding to the number of unit structures may be generated along the longitudinal axis (for example, the y-axis) in a direction perpendicular to the axis along which the external force is generated.

Also, when the thickness of the auxetic 20 is large, a strain related to another axis may be greater. In addition, when the thickness of the auxetic 20 is small, a strain related to another axis may be smaller.

In other words, according to the present disclosure, in response to an external force generated along one axis, it is possible to control a degree of deformation (that is, a strain) generated along another axis by determining the interval between the plurality of unit structures or the thickness of each of the plurality of unit structures differently during a printing process of forming the auxetic 20.

For example, when the stretchable substrate 100 including the auxetic 20 is used in the field of displays, deformation in another axial direction corresponding to an external force generated along one axis may cause distortion of a screen of a stretchable display. Accordingly, there is a need for the stretchable substrate 100 having a small strain in another axial direction in response to an external force generated along one axis. In this case, according to the present disclosure, during a processing process, the interval between the plurality of unit structures is determined to be short, or the thickness of each of the plurality of unit structures is determined to be large, thereby controlling a strain generated along another axis. That is, the stretchable substrate 100 of the present disclosure may be manufactured through the interval between the plurality of unit structures or the thickness of the plurality of unit structures according to the needs of a user and thus may be a substrate allowing a strain generated along another axis to be controllable.

In an additional embodiment, the stretchable substrate 100 may include an auxetic 20 having one or more partitioned regions, and unit structures with different intervals or thicknesses may be formed to correspond to each of the partitioned regions. In this case, the one or more partitioned regions may be regions partitioned based on an arrangement of elements associated with the stretchable substrate 100. For example, a region of the stretchable substrate 100 in which many associated elements are expected to be arranged may include unit structures having a different interval or thickness from other regions. That is, unit structures having a different interval or thickness from other regions are formed in a region expected to be most affected by a strain due to the intensive arrangement of elements, thereby controlling a strain to provide an effect of securing connection stability to the elements. For example, in a region in which elements are intensively disposed, the interval between the plurality of unit structures is determined to be short, or the thickness of the plurality of unit structures is determined to be large, thereby minimizing a strain.

That is, a printing process using an elastic material may be performed on an upper portion of the substrate part 10 to form the auxetic 20. In other words, by using the substrate part 10 as a support, a plurality of unit structures having a specific shape may be formed (stacked) on the upper portion through a printing process using an elastic material, thereby forming the auxetic 20. In this case, the interval or thickness of the plurality of unit structures constituting the auxetic 20 may be determined based on a strain, which is to be controlled as described above, related to another axial direction.

According to an embodiment, the substrate part 10 and the auxetic 20 may include the same elastic material. For example, the stretchable substrate 100 of the present disclosure may be used in the field of displays. When the auxetic 20 and the substrate part 10 constituting the stretchable substrate 100 are made of different materials under these use conditions, a difference in refractive index between the auxetic 20 and the substrate part 10 occurs, and thus there is a concern that the resolution of a displayed screen may be insufficient. For example, when the substrate part 10 and the auxetic 20 are made of different materials, a difference in refractive index between the materials occurs, and thus an aspect of the auxetic formed on the substrate part 10 may be exposed, which may make it difficult to secure visibility.

Accordingly, the auxetic 20 and the substrate part 10 of the stretchable substrate 100 of the present disclosure may include the same material. For example, when the auxetic 20 includes a mechanical metamaterial of PDMS, the substrate part coupled to the auxetic 20 may include the same PDMS material. That is, a difference in refractive index between the auxetic 20 and the substrate part 10 is minimized to secure transparency, thereby providing the stretchable substrate 100 with improved visibility in the field of display applications. Therefore, the stretchable substrate 100 of the present disclosure is manufactured in consideration of a refractive index between materials, thereby providing improved transparency. Also, since the auxetic 20 and the substrate part 10 are made of the same material, adhesion can be improved upon coupling or impregnation between materials, thereby securing stability and durability. The detailed description of the above-described material constituting the auxetic and the substrate part is merely an example, and the present disclosure is not limited thereto.

In an embodiment, the auxetic 20 and the substrate part 10 are made of the same material, and different curing processes are performed such that the auxetic 20 and the substrate part 10 have different Young's moduli, that is, different mechanical strengths.

In a specific embodiment, in the case of the auxetic 20, a ratio of a curing agent to an elastic material may be increased, and curing is performed at a high temperature for a long time, thereby increasing mechanical strength. In the case of the substrate part 10, a ratio of a curing agent to an elastic material is decreased, and curing is performed at a low temperature for a long time, thereby decreasing mechanical strength.

According to one embodiment of the present disclosure, the method of manufacturing a stretchable substrate having improved thickness deformation uniformity through control of a spatial crosslinking degree may include forming a fixing part 30 on the substrate part 10 on which the auxetic 20 is formed (S130).

According to an embodiment, the fixing part 30 may be formed by coating the substrate part 10, on which the auxetic 20 is formed, with a filler in a liquid state, and curing the filler. As the filler in a liquid state is cured, the fixing part 30 for fixing the auxetic 20 is formed. In an embodiment, the filler for forming the fixing part 30 may be an elastomer which is a high molecular material exhibiting rubber elasticity at room temperature. The elastomer may include a thermosetting elastomer cured by heat and a photocurable elastomer cured by light.

That is, as shown in FIG. 7, since the substrate part 10 is provided in the shape of a thin film, a lower surface of the entire stretchable substrate 100 may be formed, and the auxetic 20 may be printed on one surface of the corresponding substrate part 10 to have a specific thickness. After the auxetic 20 is printed on the one surface of the substrate part 10 to have a specific thickness, the corresponding substrate part 10 may be coated with the filler in a liquid state, and curing may be performed to form the fixing part 30.

In an embodiment, the auxetic 20 may be made of a material having higher strength than the fixing part 30. The auxetic 20 may be provided to have a Young's modulus that is higher than a Young's modulus of the fixing part 30. That is, since the auxetic 20 is provided to have a higher Young's modulus than the substrate part and the fixing part 30, the deformation of the auxetic 20 may have a great effect on the deformation of the entire stretchable substrate 100.

Since the stretchable substrate 100 including the substrate part 10, the auxetic 20, and the fixing part 30 is greatly affected by the deformation of the auxetic having relatively high strength, the stretchable substrate 100 may be provided to have a negative Poisson's ratio. In other words, in the case of the substrate part 10 and the fixing part 30, when the auxetic 20 is deformed to implement a negative Poisson's ratio, it is preferable that the substrate part 10 and the fixing part 30 have lower mechanical strength than the auxetic 20 so as not to have a significant effect on mechanical deformation for implementing a negative Poisson's ratio.

Meanwhile, as described above, when the stretchable substrate 100 is stretched in one direction, in accordance with an entire area, a degree of deformation in a thickness direction may be different in each region. Specifically, since contraction in the thickness direction is further accelerated in accordance with a region of the fixing part 30 having lower mechanical strength than the auxetic 20, an uneven topology is formed on a surface. Such a topology refracts and scatters light incident on a substrate in irregular directions, thereby limiting visibility and reducing the mechanical reliability of electronic elements in contact with a surface. That is, since the mechanical strength of the auxetic 20 is different from that of the fixing part 30 and stress induced in each region of a substrate is different, when an external force for stretching is applied, a surface does not contract uniformly, but a degree of deformation (or contraction) is different in each region.

According to present disclosure, in order to prevent nonuniform thickness deformation from occurring when a stretchable substrate is stretched, a thickness deformation degree deviation can be improved through programming of a spatial crosslinking degree of a fixing part (or matrix). Since a crosslinking degree of the fixing part 30 affects a thickness strain of a substrate, the crosslinking degree of the fixing part 30 for each region is programmed, thereby allowing a thickness of the entire substrate to be uniformly changed when the substrate is stretched.

In an embodiment, the fixing part 30 may have a different vertical crosslinking degree at each position. Here, the vertical crosslinking degree may be related to a vertical (or thickness) direction of a substrate and may be a crosslinking degree in a direction perpendicular to a specific surface corresponding to a direction in which the substrate is extended (or stretched).

According to an embodiment, in a process of forming the fixing part 30, a crosslinking agent post-treatment process may be performed to form the fixing part such that a vertical crosslinking degree is different in each region. Here, the crosslinking agent post-treatment process may be a process of controlling a vertical crosslinking degree of the fixing part 30 by controlling a degree to which a crosslinking agent permeates into a filler in a liquid state in a process of forming the fixing part 30. By controlling a vertical strain differently for each region of a substrate through the crosslinking agent post-treatment process, when the substrate is stretched in one direction, a degree of contraction of an entire surface can be made uniform. As an example, the crosslinking agent post-treatment process may be performed such that, when a substrate is stretched, a depth of penetration of a crosslinking agent is made deep in a filler at a position corresponding to a region in which contraction rapidly occurs (for example, a central region of the filler), and a depth of penetration of the crosslinking agent is made shallow in a filler at a position corresponding to a region in which relatively large contraction does not occur (for example, a region in which an auxetic is formed).

In another embodiment, in the present disclosure, a layer for dissipating stress (for example, a stress dissipation layer) may be attached to at least one surface of the stretchable substrate 100 including the substrate part 10, the auxetic 20, and the fixing part 30. Through the configuration of a stress dissipation layer 40, induced stress concentrated in the auxetic 20 can be dispersed when the substrate is stretched. Thus, it is possible to improve vertical deformation distortion of a substrate during stretching of the substrate and also improve the mechanical reliability of a display device to be introduced.

As described above, in the stretchable substrate 100 according to the present disclosure, the crosslinking agent post-treatment process can be performed to program a different crosslinking degree for each region of the substrate, or the stress dissipation layer can be attached to at least one surface of the substrate to allow vertical deformation to be uniform. Hereinafter, a process of controlling a vertical crosslinking degree of each region of a substrate in various ways will be described in detail with reference to FIGS. 8 to 12.

Figure 8:
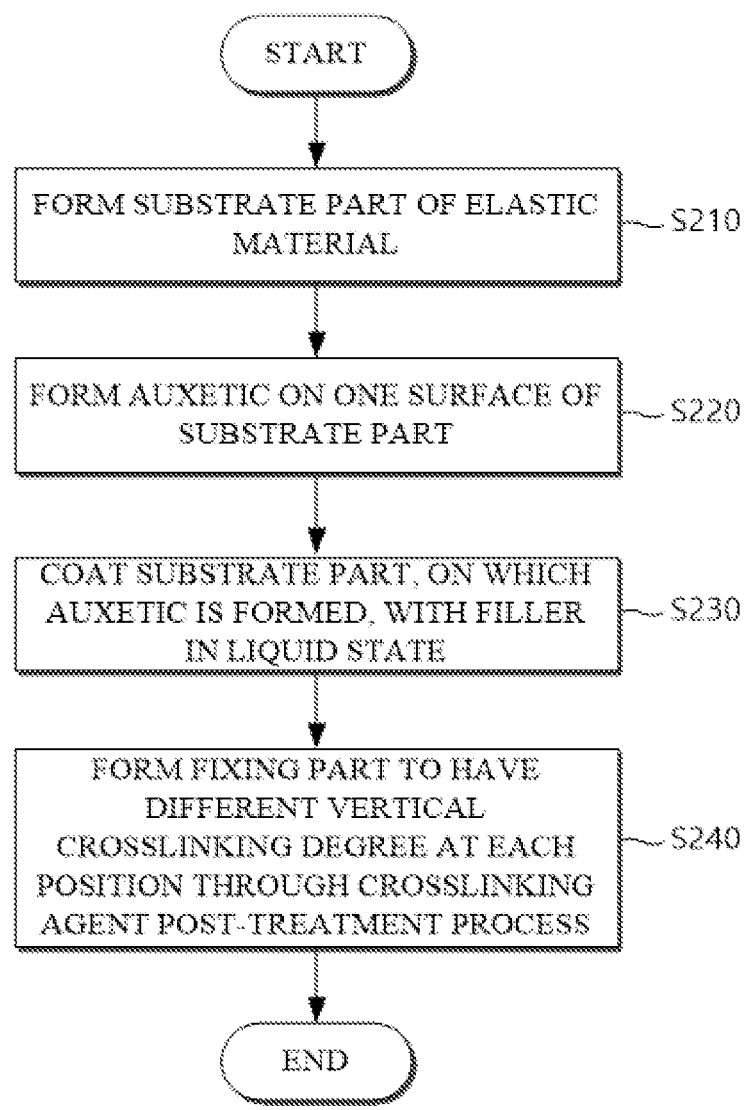
FIG. 8 is an exemplary flowchart for manufacturing a stretchable substrate through a crosslinking agent post-treatment process according to one embodiment of the present disclosure.

FIG. 8 is an exemplary flowchart for manufacturing a stretchable substrate through a crosslinking agent post-treatment process according to one embodiment of the present disclosure. The order of operations shown in FIG. 8 may be changed as needed, and at least one operation may be omitted or added. The content described with reference to FIGS. 6 to 7 can be referenced for the features that overlap the features described above with reference to FIGS. 6 to 7 among the features of the content shown in FIG. 8, and description thereof will be omitted here According to one embodiment of the present disclosure, a method of manufacturing a stretchable substrate having improved thickness deformation uniformity through control of a spatial crosslinking degree may include forming a substrate part 10 of an elastic material (S210). The substrate part 10 is provided in the shape of a thin film to form a lower surface of a stretchable substrate 100 and support an auxetic 20 and a fixing part 30.

According to one embodiment of the present disclosure, the method of manufacturing a stretchable substrate having improved thickness deformation uniformity through control of a spatial crosslinking degree may include forming the auxetic 20 on one surface of the substrate part 10 (S220). The auxetic 20 is stacked and formed to have a certain thickness (or height) in an upward direction from the substrate part 10 having a shape of a thin film.

According to one embodiment of the present disclosure, the method of manufacturing a stretchable substrate having improved thickness deformation uniformity through control of a spatial crosslinking degree may include coating the substrate part 10, on which the auxetic 20 is formed, with a filler in a liquid state (S230). According to an embodiment, the fixing part 30 may be formed by coating the substrate part 10, on which the auxetic 20 is formed, with a filler in a liquid state, and curing the filler. As the filler in a liquid state is cured, the fixing part 30 for fixing the auxetic 20 is formed. In an embodiment, the filler for forming the fixing part 30 may be an elastomer which is a high molecular material exhibiting rubber elasticity at room temperature.

According to one embodiment of the present disclosure, the method of manufacturing a stretchable substrate having improved thickness deformation uniformity through control of a spatial crosslinking degree may include forming the fixing part to have a different vertical crosslinking degree at each position through a crosslinking agent post-treatment process (S240).

In an embodiment, the crosslinking agent post-treatment process may be a process of controlling penetration information of a crosslinking agent in a thickness direction of the fixing part 30. That is, the crosslinking agent post-treatment process may be a process of controlling the vertical crosslinking degree of the fixing part 30 by controlling a degree to which the crosslinking agent permeates into the filler in a liquid state in a process of forming the fixing part 30. By controlling a vertical strain differently for each region of a substrate through the crosslinking agent post-treatment process, when the substrate is stretched in one direction, a degree of contraction of an entire surface can be made uniform.

The crosslinking agent post-treatment process may include temperature and time conditions that do not cause deformation of the substrate part 10 and do not affect the Young's modulus deformation of the auxetic 20. For example, when the deformation of the substrate part 10 and the auxetic 20 is caused during the crosslinking agent post-treatment process, the mechanical properties of the stretchable substrate may be degraded. Since each of the substrate part 10 and the auxetic 20 is formed through curing conditions corresponding to a specific temperature and time, the crosslinking agent post-treatment process performed after the substrate part 10 and the auxetic 20 are formed is preferably performed under temperature and time conditions that do not cause deformation of the substrate part and the auxetic 20. In an embodiment, the crosslinking agent post-treatment process is preferably performed at a temperature of less than 100° C. for up to 180 minutes or less. The auxetic 20 is formed on one surface of the substrate part 10 through a printing process and is provided in combination with the substrate part 10 through specific curing conditions. The auxetic 20 may be provided and attached to the substrate part 10 through curing at a temperature of 100° C. for 180 minutes. Accordingly, the crosslinking agent post-treatment process may be preferably performed at a temperature of less than 100° C. which does not cause deformation of the auxetic 20 and may be performed under a condition of a time that does not exceed 180 minutes. Under the temperature and time conditions of the above-described crosslinking agent post-treatment process, the deformation of the substrate part 10 and the Young's modulus deformation of the auxetic 20 are not caused during the crosslinking agent post-treatment process, thereby providing a stretchable substrate through the introduction of a mechanical metamaterial and also controlling a vertical crosslinking degree at each position through the crosslinking agent post-treatment process.

In an embodiment, the crosslinking agent post-treatment process may be performed through different temperature and time conditions at each position at which the fixing part 30 is formed. The performing of the crosslinking agent post-treatment process through different temperature and time conditions at each position is to program and form a different vertical crosslinking degree at each position. For example, a fixing part region corresponding to a first position having a relatively high vertical crosslinking degree may have higher mechanical strength than a fixing part region corresponding to a second position having a relatively low vertical crosslinking degree. High mechanical strength consequently means less strain.

That is, the crosslinking agent post-treatment process may be performed such that a depth to which the crosslinking agent is injected is deep in a fixing part region corresponding to a position at which deformation in a thickness (for example, vertical) direction is large, and a depth to which the crosslinking agent is injected is shallow in a fixing part region corresponding to a position at which deformation in the thickness direction is small.

Figure 9:
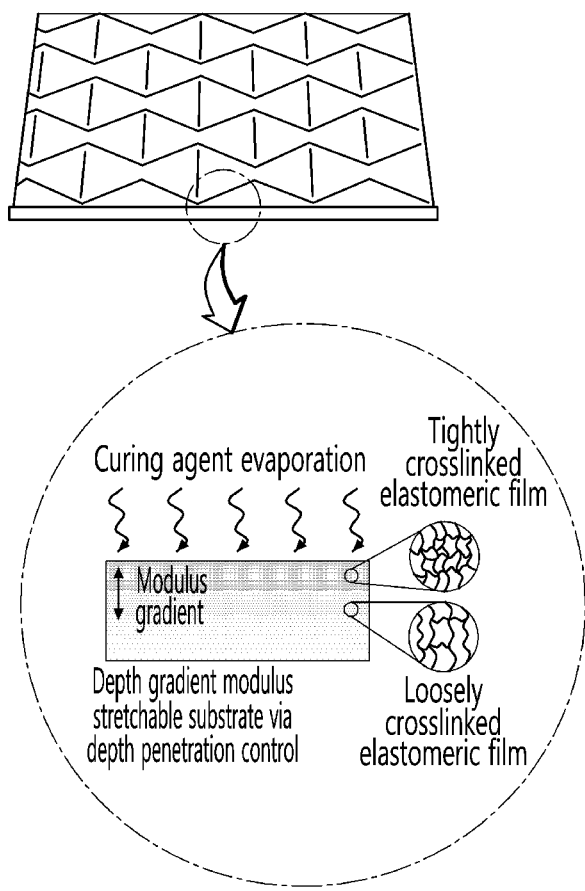
FIG. 9 is an exemplary flowchart for manufacturing a stretchable substrate through a crosslinking agent post-treatment process according to one embodiment of the present disclosure.

In an embodiment, as shown in FIG. 9, after the crosslinking agent is injected in a state of being filled with the filler in a liquid state, the crosslinking agent penetrates into the filler through heat treatment related to the crosslinking agent post-treatment process. Here, a degree of permeation of the crosslinking agent into the filler (that is, the fixing part) is determined according to a temperature and time of the crosslinking agent post-treatment process. For example, as a temperature of the crosslinking agent post-treatment process is high and a time thereof is short, a crosslinking degree of a surface can be increased, and a crosslinking degree deviation in a depth direction can be improved. A temperature and a time may be adjusted to control a size and deviation of a crosslinking degree according to the purpose.

According to an embodiment, when an external force for stretching of a substrate is applied, unit structures positioned at an edge are easily stretched, but unit structures positioned at a central portion may not completely receive a force and thus may be less easily stretch. The stretching of unit structures may consequently accelerate contraction in a vertical direction. In this case, deformation in the vertical (or thickness) direction is larger at an edge (or an end region). In other words, contraction in the vertical direction is relatively small in a central region, and contraction in the vertical direction is relatively large in an edge region. As described above, since a degree of contraction may be different at each position when a substrate is stretched, in the present disclosure, the crosslinking agent post-treatment process may be performed such that a vertical crosslinking degree increases in a direction away from a center.

That is, the highest temperature is supplied to a central region, and a temperature is decreased in a direction away from the central region to perform the crosslinking agent post-treatment process so that a penetration depth of the crosslinking agent is different at each position. In this case, the penetration depth of the crosslinking agent may be shallow in the central region, and the penetration depth of the crosslinking agent may increase toward the edge region.

Therefore, in a direction from a center to an edge region, a strain decreases due to an increase in mechanical strength according to a penetration depth of the crosslinking agent. Thus, when a substrate is stretched, in response to stress induced in the entire substrate, a degree of contraction of the entire substrate in the vertical direction may be uniform. That is, even when a substrate is stretched, since uniform contraction in a thickness direction is performed, a thickness deviation at each position can be improved, and the image visibility and mechanical reliability of a display element can be improved.

Figure 10:
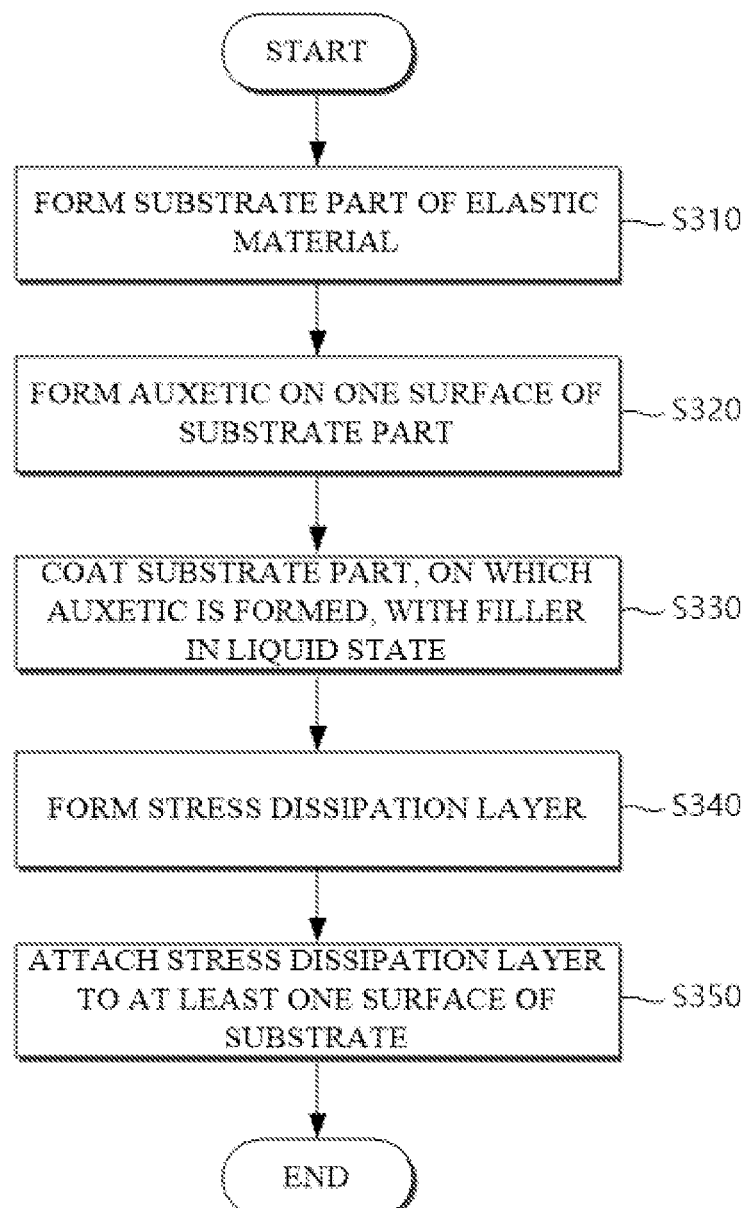
FIG. 10 is an exemplary flowchart for manufacturing a stretchable substrate through introduction of a stress dissipation layer according to another embodiment of the present disclosure.

FIG. 10 is an exemplary flowchart for manufacturing a stretchable substrate through introduction of a stress dissipation layer according to another embodiment of the present disclosure. The order of operations shown in FIG. 10 may be changed as needed, and at least one operation may be omitted or added. The content described with reference to FIGS. 6 to 7 can be referenced for the features that overlap the features described above with reference to FIGS. 6 to 7 among the features of the content shown in FIG. 10, and description thereof will be omitted here According to another embodiment of the present disclosure, a method of manufacturing a stretchable substrate having improved thickness deformation uniformity through control of a spatial crosslinking degree may include forming a substrate part 10 of an elastic material (S310).

According to another embodiment of the present disclosure, the method of manufacturing a stretchable substrate having improved thickness deformation uniformity through control of a spatial crosslinking degree may include forming an auxetic 20 on one surface of the substrate part 10 (S320).

According to another embodiment of the present disclosure, the method of manufacturing a stretchable substrate having improved thickness deformation uniformity through control of a spatial crosslinking degree may include coating the substrate part 10, on which the auxetic 20 is formed, with a filler in a liquid state (S330).

According to another embodiment of the present disclosure, a method of manufacturing a stretchable substrate having improved thickness deformation uniformity through control of a spatial crosslinking degree may include forming a stress dissipation layer (S340).

In an embodiment, a stress dissipation layer 40 may be made of an elastomer material.

The stress dissipation layer 40 may have a higher Young's modulus than a fixing part and may be provided to have a similar Young's modulus to the auxetic to control a Poisson's ratio.

Figure 11:
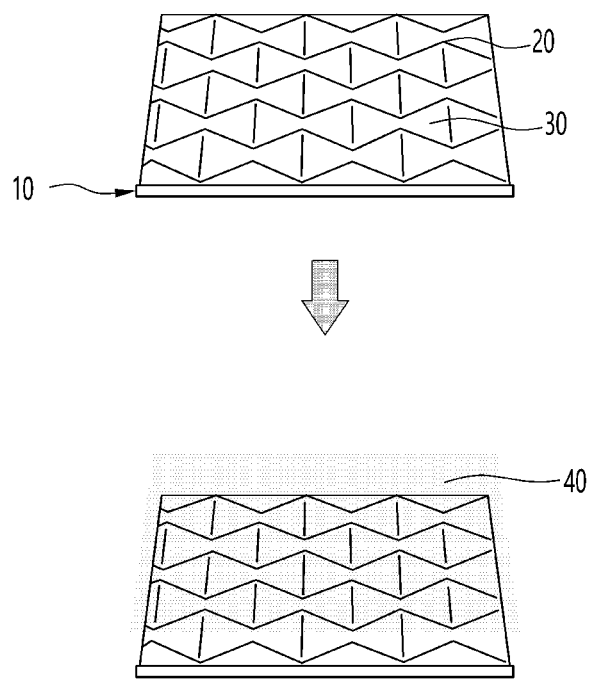
FIG. 11 shows exemplary views illustrating processes of manufacturing a stretchable substrate through introduction of a stress dissipation layer according to another embodiment of the present disclosure.

As shown in FIG. 11, the stress dissipation layer 40 is provided to have a shape corresponding to an area of a substrate and is attached to at least one surface of the substrate.

According to another embodiment of the present disclosure, the method of manufacturing a stretchable substrate having improved thickness deformation uniformity through control of a spatial crosslinking degree may include attaching the stress dissipation layer 40 to at least one surface of a substrate (S350). In an embodiment, the stress dissipation layer 40 may be attached to one surface or two surfaces of the substrate. According to an embodiment, curing may be performed in a state in which the stress dissipation layer 40 is in contact with at least one surface of the substrate so that the stress dissipation layer 40 may be attached to the substrate.

In the above description, it has been described that the stress dissipation layer 40 is separately manufactured or formed to be attached to at least one surface of a stretchable substrate 100, which includes the substrate part 10, the auxetic 20, and a fixing part 30, through curing, but the stress dissipation layer 40 may be formed through a printing process on one surface of the substrate 100. Since the stress dissipation layer 40 is made of the same material as a filler for forming the fixing part 30, that is, an elastomer, the stress dissipation layer 40 may have a strong adhesive force with the substrate, thereby ensuring improved stability.

According to an embodiment, the stress dissipation layer 40 may have a Young's modulus that is higher than or equal to a Young's modulus of the auxetic 20 and may have a thickness of 1/20 or less of a thickness of the auxetic 20. The stress dissipation layer 40 has a Young's modulus higher than or equal to that of a material constituting the auxetic 20 and preferably has a thickness of up to 5% of a thickness to which the auxetic 20 is formed. For example, when the stress dissipation layer is provided to have a Young's modulus smaller than that of the auxetic 20 or has a thickness greater than or equal to a certain thickness or more as compared with a thickness of the auxetic on which the stress dissipation layer 40 is formed (for example, when the stress dissipation layer 40 has a thickness exceeding 5 thicknesses with respect to 100 thicknesses of the auxetic), in the situation of stretching (or elongation), induced stress concentrated in a specific region cannot be properly distributed according to the deformation of the auxetic 20.

Figure 12A:
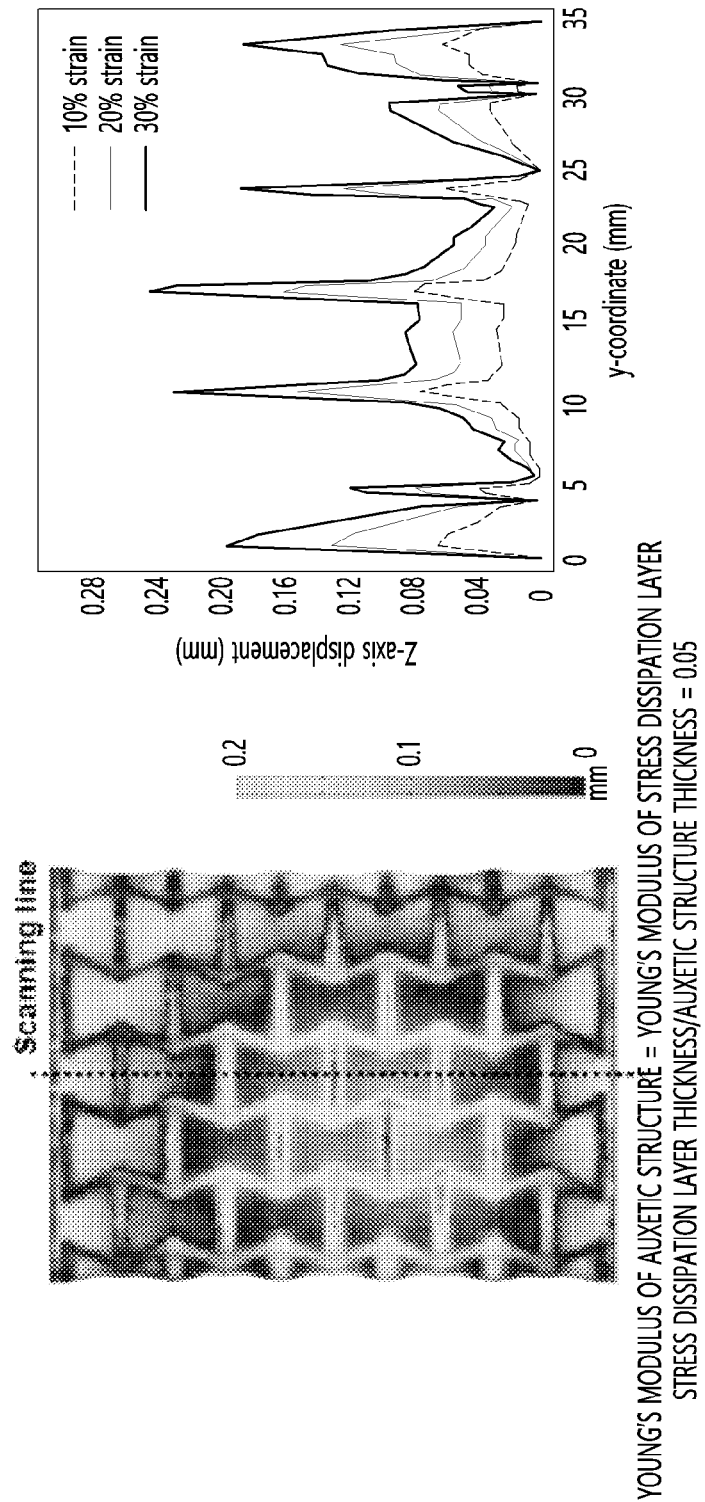
FIG. 12A shows exemplary diagrams showing experimental results showing that stress concentration is dispersed when a stress dissipation layer is introduced according to one embodiment of the present disclosure.

FIG. 12A shows surface profile simulation results generated when a stretchable substrate to which a stress dissipation layer is not introduced is stretched by 10%, 20%, and 30%. Looking at the results, it can be confirmed that a degree of a z-axis change (that is, z-axis displacement or displacement along a thickness direction axis) is large in each of a plurality of regions of the stretchable substrate corresponding to a y-coordinate (that is, a vertical direction in FIG. 12A) of the stretchable substrate. That is, as induced stress is concentrated in a specific region of an auxetic during stretching, a large change may occur in a z-axis direction, and at the same time, it can be confirmed that nonuniform deformation entirely occurs. For example, in a region corresponding to 5 mm in a y-direction, relatively small deformation may occur along a z-axis, and in a region corresponding to 16 mm to 17 mm, it can be seen that relatively large deformation occurs along the z-axis. That is, it can be confirmed that nonuniform stress acts on the entire region.

Figure 12B:
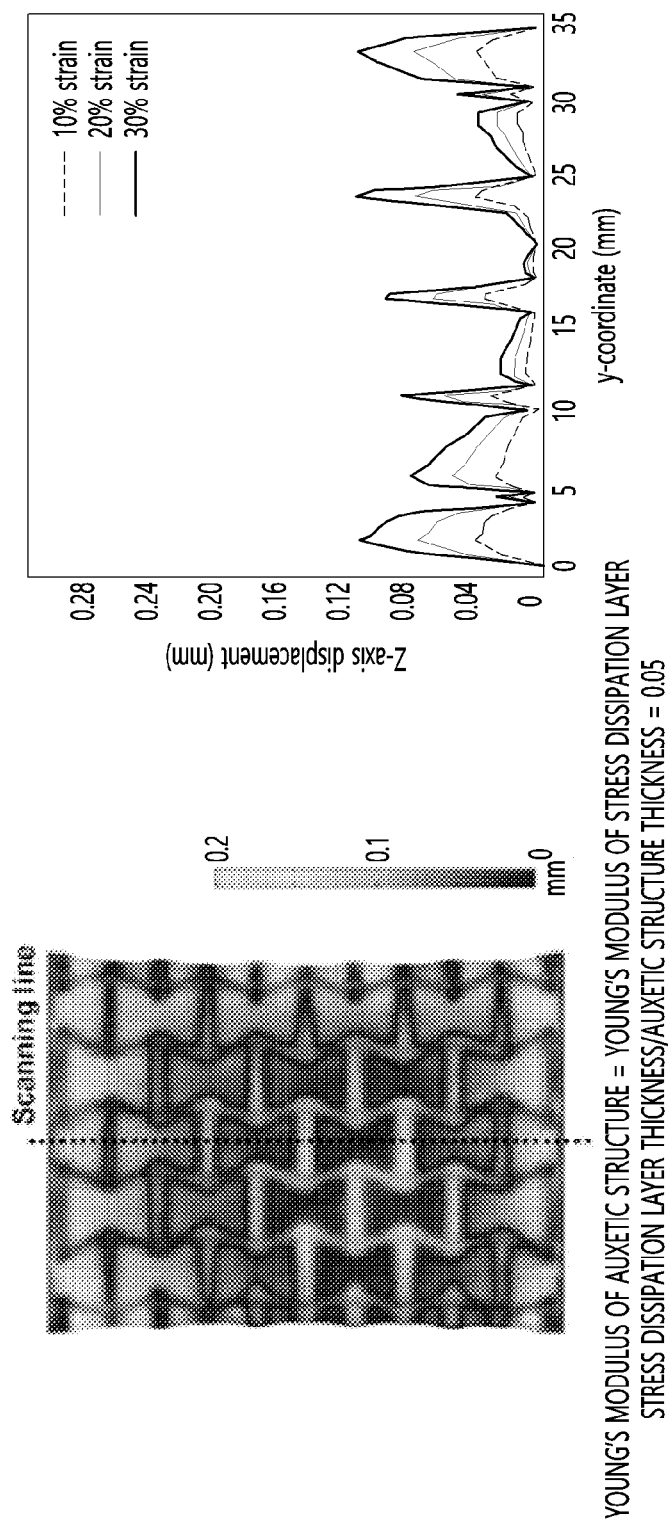
FIG. 12B shows exemplary diagrams showing experimental results showing that stress concentration is dispersed when a stress dissipation layer is introduced according to one embodiment of the present disclosure.

FIG. 12B shows surface profile simulation results generated when a stretchable substrate to which a stress dissipation layer is introduced is stretched by 10%, 20%, and 30%. In this case, the introduced stress dissipation layer is provided to have the same Young's modulus as an auxetic and is provided to have a thickness of 5% of a thickness by which the auxetic is formed. Referring to FIG. 12B, it can be seen that a deviation of z-axis deformation in each region is significantly smaller than that of the stretchable substrate to which the stress dissipation layer 40 is not introduced. That is, when the stress dissipation layer 40 is provided, it can be confirmed that not only is a degree of deformation along a z-axis reduced, but also the concentration of stress in a specific region is minimized. In particular, when the stress dissipation layer 40 is introduced, it can be seen that even when a degree to which the substrate is stretched increases, a deviation in each region does not increase.

The stress dissipation layer 40 is attached to at least one surface of the substrate, thereby distributing induced stress concentrated in the auxetic 20. That is, since the stress dissipation layer 40 having the shape of a thin film is provided on at least one surface of the substrate, when the substrate is stretched, a stress dissipation effect can be induced to allow the substrate to be uniformly contracted in a thickness direction in an entire region of the substrate. Thus, it is possible to improve vertical deformation distortion of a substrate during stretching of the substrate and also improve the mechanical reliability of a display device to be introduced.

According to various embodiments of the present disclosure, by spatially controlling a crosslinking degree of a matrix of a stretchable substrate into which a mechanical metamaterial is introduced, a uniform thickness distribution at each position can be induced, thereby controlling uniform stretching deformation of the substrate.

Effects of the present disclosure may not be limited to the above-described ones, and the other unmentioned effects of the present disclosure will become apparent to those skilled in the art from the above description.

Although the embodiments of the present disclosure have been described with reference to the accompanying drawings, it should be understood that those skilled in the art can carry out other modifications without changing the technical spirit or essential features of the present disclosure. Therefore, it should be understood that the embodiments described herein are illustrative and not restrictive in all aspects.

Particular implementations described in the present disclosure are exemplary and do not limit the scope of practiced embodiments. For conciseness of the specification, the description of conventional electronic configurations, control systems, software, and other functional aspects of systems may be omitted. Moreover, connections of lines or connecting elements between components shown in the accompanying drawings may represent functional connections and/or physical or circuit connections and may represent various kinds of replaceable or additional functional connections, physical connections, or circuit connections in an actual device. Furthermore, when not specifically described using terms such as "essentially" or "importantly," elements described in the specification may not be necessarily required for application of the present disclosure.

It will be appreciated that a specific order or a hierarchical structure of steps in the presented processes and methods is one example of exemplary approaches. It will be appreciated that the specific order or the hierarchical structure of the steps in the processes within the scope of the present disclosure may be rearranged based on design priorities. Appended method claims provide elements of various steps in a sample order, but this does not mean that the method claims are limited to the presented specific order or hierarchical structure.

The description of the presented embodiments is provided so that those skilled in the art of the present disclosure may use or implement the present disclosure. Various modifications of the embodiments will be apparent to those skilled in the art of the present disclosure, and general principles defined herein can be applied to other embodiments without departing from the scope of the present disclosure. Therefore, the present disclosure is not limited to the embodiments presented herein but should be interpreted within the widest range which is associated with the principles and new features presented herein.

What is claimed is:

1. A method of manufacturing a stretchable substrate having improved thickness deformation uniformity through control of a spatial crosslinking degree, the method comprising:
   forming a substrate part of an elastic material;
   forming an auxetic including a plurality of unit structures on the substrate part; and
   forming a fixing part on the substrate part on which the auxetic is formed,
   wherein the fixing part has a different vertical crosslinking density at each position.

2. The method of claim 1, wherein the auxetic is provided to have a Young's modulus that is higher than a Young's modulus of the substrate part and a Young's modulus of the fixing part.

3. The method of claim 1, wherein the forming of the fixing part includes forming the fixing part to have different vertical crosslinking degrees through a crosslinking agent post-treatment process, and
   the crosslinking agent post-treatment process is a process of controlling a degree of permeation of a crosslinking agent in a thickness direction of the fixing part.

4. The method of claim 3, wherein the crosslinking agent post-treatment process includes temperature and time conditions that do not cause deformation of the substrate part and do not affect Young's modulus deformation of the auxetic.

5. The method of claim 3, wherein the crosslinking agent post-treatment process is performed through different temperature and time conditions at each position at which the fixing part is formed.

6. The method of claim 3, wherein the crosslinking agent post-treatment process is performed such that a depth to which the crosslinking agent is injected is deep in a fixing part region corresponding to a position at which deformation in the thickness direction is large, and a depth to which the crosslinking agent is injected is shallow in a fixing part region corresponding to a position at which deformation in the thickness direction is small.

7. The method of claim 1, further comprising forming a stress dissipation layer, and
   attaching the formed stress dissipation layer to at least one surface of the substrate,
   wherein the stress dissipation layer is made of an elastomer material.

8. The method of claim 7, wherein the stress dissipation layer is provided to have a higher Young's modulus than the fixing part to control a Poisson's ratio.

9. The method of claim 7, wherein the stress dissipation layer is provided to have a Young's modulus that is higher than or equal to a Young's modulus of the auxetic and have a thickness of $1/20$ or less of a thickness to which the auxetic is formed.

10. A stretchable substrate having improved thickness deformation uniformity through control of a spatial crosslinking degree, the stretchable substrate comprising:
    a substrate part made of an elastic material;
    an auxetic including a plurality of unit structures and formed on the substrate part; and
    a fixing part configured to fix the auxetic,
    wherein the fixing part has a different vertical crosslinking density at each position.

11. The stretchable substrate of claim 10, wherein the auxetic is provided to have a Young's modulus that is higher than a Young's modulus of the substrate part and a Young's modulus of the fixing part.

12. The stretchable substrate of claim 10, wherein the fixing part is formed to have different vertical crosslinking degrees through a crosslinking agent post-treatment process, and the crosslinking agent post-treatment process is a process of controlling a degree of permeation of a crosslinking agent in a thickness direction of the fixing part.

13. The stretchable substrate of claim 12, wherein the crosslinking agent post-treatment process includes temperature and time conditions that do not cause deformation of the substrate part and do not affect Young's modulus deformation of the auxetic.

14. The stretchable substrate of claim 12, wherein the crosslinking agent post-treatment process is performed through different temperature and time conditions at each position at which the fixing part is formed.

15. The stretchable substrate of claim 12, wherein the crosslinking agent post-treatment process is performed such that a depth to which the crosslinking agent is injected is deep in a fixing part region corresponding to a position at which deformation in the thickness is large, and a depth to which the crosslinking agent is injected is shallow in a fixing part region corresponding to a position at which deformation in the thickness direction is small.

16. The stretchable substrate of claim 10, further comprising a stress dissipation layer provided in contact with at least one surface of the stretchable substrate and made of an elastomer material.

17. The stretchable substrate of claim 16, wherein the stress dissipation layer is provided to have a higher Young's modulus than the fixing part to control a Poisson's ratio.

18. The stretchable substrate of claim 16, wherein the stress dissipation layer is provided to have a Young's modulus that is higher than or equal to a Young's modulus of the auxetic and have a thickness of $1/20$ or less of a thickness to which the auxetic is formed.

* * * * *